United States Patent Office 3,108,252
Patented Oct. 22, 1963

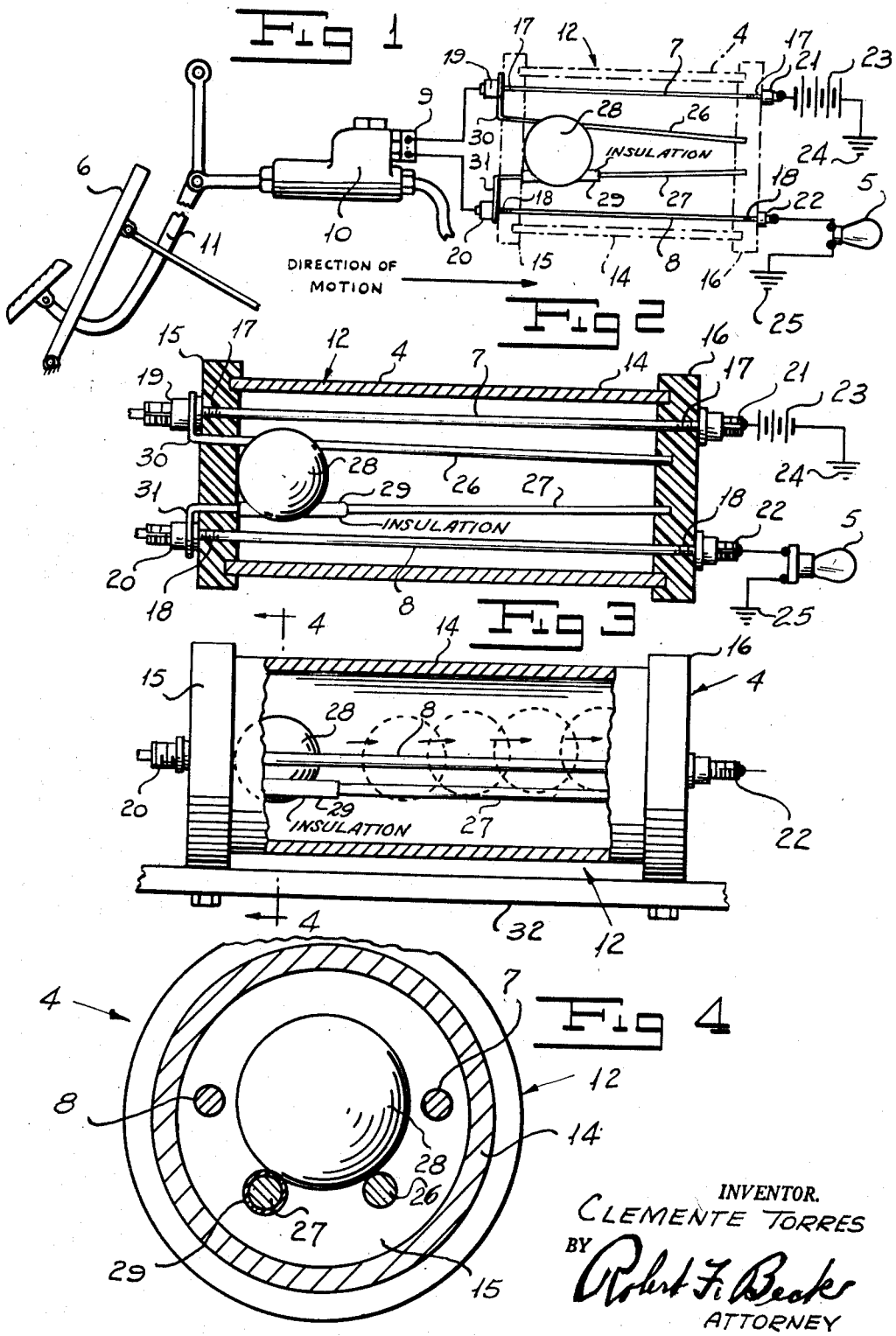

3,108,252
DECELERATION INDICATING SWITCH
Clemente Torres, 10 Maiden Lane, Little Ferry, N.J.
Filed Dec. 12, 1960, Ser. No. 75,327
3 Claims. (Cl. 340—71)

My invention relates to circuit closers and more particularly to warning switches for use in conjunction with the operation of motor vehicles and the like, some examples of prior art switches being disclosed in United States Patents Nos. 365,345, 2,383,889, 2,420,351, 2,486,965, and 2,513,754.

It is well known that motor vehicles are equipped with brake actuated stop light switches which function to energize the stop lights when the brakes of the vehicle are applied. owever these switches have often been found unsatisfactory and inadequate, especially in the operation of motor vehicles at relatively high speeds, because they fail to function and warn the drivers of trailing vehicles of the deceleration of leading vehicles in time to permit application of the brake of the trailing vehicles to accord with the speeds of the leading vehicles in order to avert forward plunging, pitching, and skidding of the vehicles and accidents thereto.

My invention serves to overcome the foregoing described objections and disadvantages of prior art stop light switches, it being one of the numerous objects of my invention to interpose the latter in the circuit between the usual stop light switch and the stop light to effect energization and illumination of the stop light in advance of energization thereof by the stop light switch upon deceleration of the vehicle.

Another object of my invention is to provide a warning switch or circuit closer of the foregoing described character which is equipped with and rendered effective by momentum responsive means upon deceleration of the vehicle in which the closer is incorporated.

A further object of my invention is to provide a circuit closer of the foregoing described character which may be readily incorporated in the stop light circuit of a motor vehicle already in use and without modifying or interfering with the normal operation of the stop light switch of the vehicle.

An important object of my invention is to provide a circuit closer or a warning switch of the foregoing described character which is simple in construction, durable in use, efficient in operation, economical in manufacture, and capable of being incorporated in a motor vehicle and the like by other than a highly skilled artisan.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

FIGURE 1 is a diagrammatic view illustrating a motor vehicle stop light circuit having my invention incorporated therein;

FIGURE 2 is a horizontal sectional view of my invention and illustrating the warning circuit in open condition;

FIGURE 3 is a side elevation, partly in section, of my circuit closer; and

FIGURE 4 is a detail sectional view taken on the line 4—4 of FIGURE 3.

In practicing my invention, as illustrated in the drawings, I provide a circuit closer or warning switch 4 for actuating the stop light 5 connected within the stop light circuit of a motor vehicle or the like equipped with an accelerator 6 operable for feeding fuel to the engine of the vehicle to maintain or increase the speed thereof. The warning switch 4 includes a spaced pair of electrical conductors or bus bars 7 and 8 interposed in the stop light circuit between the terminals of the stop light 5 and a stop light switch 9 mounted on the brake fluid cylinder 10 of the vehicle, the switch 9 being actuated in response to the operation of the brake pedal 11 in applying and releasing the brakes of the vehicle in the usual manner. More specifically and which is customary, when the switch 9 is actuated to a closed circuit position, by applying the brakes, the stop light 5 in the circuit will be energized and illuminated to indicate braking of the vehicle, and when said switch 9 is moved to an open circuit position, upon release of the brakes, the stop light 5 will be deenergized and extinguished.

My circuit closer or warning switch 4 comprises an elongated housing 12 having a cylindrical side wall 14 and closed at its ends by oppositely disposed spaced rear and front closure discs or end walls 15 and 16, respectively, the end walls being constructed of insulating material as illustrated in FIGURE 2 of the drawing. Arranged lengthwise within the housing 12 are the spaced electrical conductors or bus bars 7 and 8 and which have threaded end portions 17 and 18, respectively, extending outwardly through the end walls 15 and 16.

The end portions 17 and 18 of the bus bars, adjacent the rear end wall 15, have threaded thereon suitable electrical connecting means or devices 19 and 20 for connecting the bars 7 and 8 to the terminals, respectively, of the stop light switch 9. The opposite end portions 17 and 18 of the bars 7 and 8 also have threaded thereon connecting means or devices 21 and 22, respectively, with the device 21 being connected to one terminal of a source of power, for instance, a battery 23 which has its other terminal grounded as at 24. The device 22 is connected to one terminal of the stop light 5 which has its other terminal grounded as at 25 to establish a grounded connection between the stop light 5 and the battery 23 in the usual manner.

Disposed lengthwise within the housing 12 are a spaced pair of inclined electrical conductors, tracks or rods 26 and 27, respectively, and which rods constitute switch contact members which are bridged by a ball or spherical switch contact member 28 mounted on the rods for traveling or rolling engagement thereover. As shown in the drawing, the rod 27, adjacent the rear wall 15, is provided with an insulated rear end section 29, which may be in the form of a relatively thin sleeve of insulating material sleeved upon a diametrically reduced section, on which the ball 28 may seat or rest when disposed adjacent the rear wall 15. If desired, the rear end section of the rod 26 may also be similarly insulated.

As depicted in FIGURE 2 of the drawing, the front ends of the rods 26 and 27 extend and terminate within the front wall 16 and are insulated by the latter from each other while their rear end portions are likewise insulated from each other and project through the rear wall 15 and have their outer ends 30 and 31 electrically connected to the devices 19 and 20 whereby the rods 26 and 27 are disposed in circuit with and assume the same polarity as the bars 7 and 8, respectively. The rods 26 and 27 extend in a common plane and incline forwardly and towards each other to dispose their front end portions in a closer relationship than their rear end portions to maintain the ball seated on the rear portions of the rods and effect gravitation of the ball 28 from the front end portions to the rear end portions, when the latter portions are lowered with respect to the front end portions or the rods 26 and 27 are disposed in a common substantially horizontal plane, by reason of the shifting of the center of gravity of the ball relative to the rods. However, if desired, the rods 26 and 27 may extend forwardly and upwardly to achieve an inclination and thus effect the aforementioned seating and gravitation of the ball. With reference to FIGURE 4 of the drawings, it will be apparent that the spacing of the wall 12 and the bars 7 and 8 relative to the tracks 26 and 27 is such as to effect caging or confining of the ball to the tracks as against any appreciable or permanent dislodgment therefrom.

The housing 12 is mounted upon a suitable support, for instance, a bracket 32 carried by the motor vehicle, and extends in horizontality with the vehicle. The rear and front walls 15 and 16 of the housing, in the present instance, are disposed in proximate relation to the rear of the vehicle, respectively. However, it is to be understood that my circuit closer 4 may be connected to and directly supported in a horizontal position with that of the vehicle by the stop light switch 9 through the medium of suitable adapters connecting the devices 19 and 20 to the terminals of the stop light switch or, in an instance where the stop light switch is mounted prejacent the front wall 16, by suitable adapters connecting the devices 17 and 18 to the terminals of the stop light switch, and the devices 19 and 20 to the battery and stop light, respectively, in the same manner as previously disclosed with respect to the devices 21 and 22.

In use, assuming my circuit closer 4 is mounted on a motor vehicle in the foregoing described manner, the ball 28 seated on the rod 26 and sleeve 29 of the rod 27 adjacent the rear wall 15, and the motor vehicle operated over a substantially level or forwardly inclined surface by the feeding of fuel to the engine through the medium of pressure applied through the accelerator 6, when the pressure from the operator's foot is decreased or removed from the accelerator 6 the speed of the vehicle will be decelerated or diminished whereupon the ball 28, due to momentum, will move over the tracks or rods 26 and 27 towards the front wall 16 and bridge and close the circuit between the tracks as soon as the ball advances from the sleeve 29. This closing of the circuit, between the tracks or rods 26 and 27, effects a simultaneous closing of the circuit between the rear ends 17 and 18 of the bars 7 and 8 with the result that the stop light 5 is immediately energized and illuminated in advance of any closing of the switch 9, thus serving as a warning to the driver of a trailing vehicle that the leading vehicle has diminished its speed and that the brakes of the leading vehicle may possibly be applied momentarily.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is, therefore, to be understood that the invention is not limited to the specific construction as illustrated and described, as the same is only illustrative of the principles involved which are capable of extended application in various forms, and the invention comprehends all construction within the scope of the appended claims.

What I claim is:

1. A deceleration indicating switch adapted to be mounted on a vehicle for unitary movement therewith and comprising, a housing having spaced leading and trailing ends, a pair of spaced electrical conductors extending within said housing between said ends in insulated relation with said housing for connection within a deceleration signaling circuit, one of said conductors being equipped with an electrically insulated portion adjacent said trailing end, and a metallic switch contact member engaging said conductors and movable thereover away from said portion and towards said leading end for closing the circuit between said conductors in response to deceleration of the vehicle, said conductors being inclined at a pre-established degree for gravitating said member thereover away from said leading end and onto said portion for opening the circuit between said conductors upon termination of the deceleration.

2. A deceleration indicating switch adapted to be mounted on a vehicle for unitary movement therewith and comprising, a housing having spaced leading and trailing end walls constructed of insulating material, a pair of spaced electrical conductors disposed within said housing and extending through one of said end walls in insulated relation therewith for connection within a deceleration signaling circuit, one of said conductors being equipped with an electrically insulated portion adjacent said trailing end wall, and a metallic ball rotatably engaging said conductors and rollable thereover way from said portion and towards said leading end wall for closing the circuit between said conductors in response to deceleration of the vehicle, said conductors being inclined at a pre-established degree for gravitating said ball thereover away from said leading end wall and onto said portion for opening the circuit between said conductors upon termination of the deceleration.

3. A deceleration indicating switch adapted to be mounted on a vehicle for unitary movement therewith and comprising, a housing having a side wall and spaced leading and trailing end walls of insulating material, a pair of spaced bus bars disposed within said housing and extending through said end walls for connection within a deceleration signaling circuit, a pair of spaced metallic tracks disposed between said bars and connected to the latter, respectively, with at least one of said tracks being provided with a sleeve of insulating material constituting a seat adjacent said trailing end wall for insulating said last mentioned track from the other track at said latter wall, a metallic ball rotatable on said tracks in spaced relation from said bars and rollable over said tracks away from said seat and towards said leading end wall for closing the circuit between said tracks in response to deceleration of the vehicle, said tracks inclining inwardly relative to each other towards said leading end wall for gravitating said ball away from said leading end wall and onto said seat for opening the circuit between said tracks upon termination of the deceleration, said side wall and said bars having a definite spaced relationship with respect to said tracks to thereby cage said ball on said tracks against permanent dislodgment therefrom.

References Cited in the file of this patent
UNITED STATES PATENTS

| | | |
|---|---|---|
| 2,513,754 | Sidwar | July 4, 1950 |
| 2,831,183 | Womack | Apr. 15, 1958 |
| 2,891,234 | Hague | June 16, 1959 |
| 2,971,067 | Ticknor | Feb. 7, 1961 |